United States Patent
Jang et al.

(10) Patent No.: US 8,263,014 B2
(45) Date of Patent: Sep. 11, 2012

(54) METHOD AND APPARATUS FOR GENERATING A CARBON NANOTUBE

(75) Inventors: Suk-Won Jang, Seoul (KR); Byung-Yun Kong, Gyeonggi-do (KR); Chung-Heon Jeong, Gyeonggi-do (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 12/956,439

(22) Filed: Nov. 30, 2010

(65) Prior Publication Data

US 2011/0097247 A1 Apr. 28, 2011

Related U.S. Application Data

(62) Division of application No. 12/195,558, filed on Aug. 21, 2008, now abandoned.

(30) Foreign Application Priority Data

Aug. 21, 2007 (KR) .................................. 2007-83758

(51) Int. Cl.
*B01J 8/12* (2006.01)

(52) U.S. Cl. ........................ 422/232; 422/198; 977/842

(58) Field of Classification Search .................. 422/198, 422/232; 977/842
See application file for complete search history.

(56) References Cited

U.S. PATENT DOCUMENTS

| 5,102,647 A | 4/1992 | Yamada et al. |
| 5,413,773 A | 5/1995 | Tibbetts et al. |
| 7,622,059 B2 * | 11/2009 | Bordere et al. ............. 423/447.2 |
| 2004/0151654 A1 | 8/2004 | Wei et al. |
| 2005/0074392 A1 | 4/2005 | Yang et al. |
| 2006/0104887 A1 * | 5/2006 | Fujioka et al. ............. 423/447.3 |

FOREIGN PATENT DOCUMENTS

CN 1327943 A 12/2001

OTHER PUBLICATIONS

Chinese Office Action on Patent Application No. 200810130960.4 dated Aug. 5, 2010, and English translation.
File downloaded for U.S. Appl. No. 12/195,558, filed Aug. 21, 2008, file through May 4, 2011, 265 pages.

* cited by examiner

*Primary Examiner* — Randy Boyer
(74) *Attorney, Agent, or Firm* — Kilpatrick Townsend & Stockton LLP

(57) ABSTRACT

In an apparatus and method of generating a carbon nanotube (CNT), a process chamber is heated to a target temperature and a catalyst powder is supplied into the heated process chamber. The catalyst powder moves in a first direction in the process chamber. A source gas is supplied into the process chamber in a second direction opposite to the first direction, so that the source gas delays the movement of the catalyst powder in the first direction and is reacted with the catalyst powder in the process chamber to thereby produce the CNT in the process chamber. Accordingly, the flow of the source gas against the flow of the catalyst powder reduces the drop velocity of the catalyst powder. Therefore, the source gas and the catalyst powder may be reacted with each other for a sufficiently long time.

13 Claims, 7 Drawing Sheets

METHOD AND APPARATUS FOR GENERATING A CARBON NANOTUBE

CROSS-REFERENCE TO RELATED APPLICATIONS

This application is a divisional application of U.S. application Ser. No. 12/195,558, filed on Aug. 21, 2008, which claims priority under 35 U.S.C. §119 to Korean Patent Application No. 2007-83758, filed on Aug. 21, 2007 in the Korean Intellectual Property Office (KIPO), the contents of which are herein incorporated by reference in their entirety.

BACKGROUND OF THE INVENTION

1. Field of the Invention

The present invention relates to a method and an apparatus of generating a carbon nanotube (CNT). More particularly, the present invention relates to a method and an apparatus of generating a CNT by use of a catalyst powder.

2. Description of the Related Art

Carbon nanotubes (CNTs) are allotropes of carbon with a nanostructure in which carbon atoms are combined with one another in a hexagonal structure, similar to a beehive, into a cylindrical tube of which the diameter is in the order of a few nanometers. Since the CNTs have excellent mechanical properties, superior field-emission characteristics and electrical selectivity, and highly efficient hydrogen storage properties, the CNTs are widely employed in many technical fields such as aeronautical and space engineering, biological engineering, environmental energy, materials industry, medicine, computers and security and safety, etc.

In general, conventional CNTs are generated by one of an electric discharge process, a plasma chemical vapor deposition (CVD) process, a thermal CVD process and a thermal decomposition process. Particularly, the thermal CVD process and the thermal decomposition process have been most widely used to generate the CNTs.

FIG. 1 is a cross-sectional view illustrating a schematic structure of an apparatus for generating conventional CNTs.

Referring to FIG. 1, the conventional CNTs are generated by a thermal CVD process or a thermal decomposition process in the apparatus including a cylindrical process chamber 1 of which the central axis is arranged in a horizontal direction and a heater 3 enclosing the process chamber 1. The process chamber 1 is heated to a temperature of about 600° C. to about 1,100° C. by the heater 3.

Source gases are supplied into a first end portion of the process chamber 1 and are discharged out of the process chamber 1 from a second end portion of the process chamber 1 opposite to the first end portion. A substrate (not shown) is loaded into the process chamber 1 and the process chamber 1 is heated to a high temperature. The source gases are supplied into the high-temperature process chamber 1, and the CNTs are generated on the substrate in the process chamber 1.

However, the process chamber 1 is partially enclosed by the heater in the conventional apparatus, because the heat generated from the heater 3 may have undesired effects on other elements of the apparatus around the process chamber 1 when the whole surface of the process chamber 1 is enclosed by the heater 3. For that reason, the substrate is positioned only in a portion of the process chamber that is sufficiently enclosed by the heater 3, which reduces the space efficiency of the process chamber 1. Further, the reduction of the space efficiency of the process chamber 1 may prevent larger apparatuses from being used.

In addition, the process chamber 1 is directly heated by the heater 3, and thus the life span of the process chamber 1 may be significantly shortened.

SUMMARY OF THE INVENTION

The present invention provides a method of generating a carbon nanotube (CNT) from source gases using a catalyst powder.

The present invention also provides an apparatus for generating a CNT by the above-mentioned method.

According to some example embodiments of the present invention, there is provided a method of generating a CNT. A process chamber may be heated, and a catalyst powder may be supplied into the heated process chamber. The catalyst powder may move in a first direction in the process chamber. A source gas may be supplied into the process chamber in a second direction opposite to the first direction, so that the source gas may delay the movement of the catalyst powder in the first direction and be reacted with the catalyst powder in the process chamber to thereby produce the CNT in the process chamber.

In an example embodiment, the first direction is directed to a lower portion of the process chamber from an upper portion thereof, and the second direction is directed to the upper portion of the process chamber from the lower portion thereof.

In an example embodiment, the source gas is supplied into the process chamber in the second direction through a plurality of dispersion holes of a dispersion plate, the dispersion plate is disposed at the lower portion of the process chamber.

In an example embodiment, the source gas is dispersed through the dispersion plate in the second direction from a portion of the lower portion of the process chamber to the whole portion of the upper portion of the process chamber.

In an example embodiment, the source gas may be further heated in advance before supplying the source gas into the process chamber.

In an example embodiment, the CNT may be collected from the process chamber.

According to other example embodiments of the present invention, there is provided an apparatus of generating a CNT including a process chamber, a catalyst supplier that supplies a catalyst powder into the process chamber in a first direction and a source gas supplier that supplies a source gas into the process chamber in a second direction opposite to the first direction. The catalyst powder may move in a first direction in the process chamber. The source gas may delay the movement of the catalyst powder in the first direction and be reacted with the catalyst powder in the process chamber to thereby produce the CNT in the process chamber.

In an example embodiment, the first direction is directed to a lower portion of the process chamber from an upper portion thereof and the second direction is directed to the upper portion of the process chamber from the lower portion thereof.

In an example embodiment, the catalyst supplier includes at least one spray nozzle that is positioned at a sidewall of the process chamber and is directed to an upper portion of the process chamber, so that the catalyst powder is supplied to the upper portion of the process chamber through the spray nozzle and moves down in the first direction in the process chamber.

In an example embodiment, the catalyst supplier includes a dispersion net that is positioned at an upper portion of the process chamber and has a mesh structure, so that the catalyst powder is dispersively supplied to the upper portion of the process chamber through the dispersion net and moves down in the first direction in the process chamber.

In an example embodiment, the size of the dispersion net is substantially smaller than that of the process chamber.

In an example embodiment, the source gas supplier includes a gas reservoir in which the source gas is stored, a supply pipe that is connected with both of the gas reservoir and the process chamber and a control valve that is arranged at the supply pipe and controls an amount of the source gas supplied into the process chamber through the supply pipe.

In an example embodiment, the source gas supplier further includes a dispersion plate that is positioned at a lower portion of the process chamber and has a plurality of spray holes, so that the source gas is dispersively supplied into the process chamber through the spray holes and moves upward in the second direction in the process chamber.

In an example embodiment, an upper portion of the dispersion plate includes a curved surface. The size of the dispersion plate is substantially smaller than that of the process chamber.

In an example embodiment, the dispersion plate is positioned at a central portion of the process chamber spaced apart from a sidewall of the process chamber by a distance.

In an example embodiment, the source gas supplier further includes a source heater by which the source gas is heated before supplying into the process chamber. The source heater includes a heating coil enclosing at least one of the gas reservoir and the supply pipe. The source heater includes a plasma heater interposed between the gas reservoir and the control valve.

In an example embodiment, the gas reservoir includes a reaction gas reservoir in which a reaction gas is stored and a carrier gas reservoir in which a carrier gas is stored. The reaction gas may be reacted with the catalyst powder in the process chamber to thereby generate the CNT in the process chamber; and the carrier gas may carry the reaction gas into the process chamber.

In an example embodiment, the apparatus may further include a collector connected to the process chamber, so that the CNT is collected into the collector from the process chamber.

In an example embodiment, the source gas supplier further includes a dispersion plate that is positioned at a lower portion of the process chamber and dispersively supplies the source gas into the process chamber and the collector is arranged under the process chamber in such a configuration that the CNT is collected through a gap space between the dispersion plate and a sidewall of the process chamber.

In an example embodiment, the apparatus may further include a gas exhauster arranged over the process chamber and having a cylindrical shape, so that the source gas is exhausted out of the process chamber through the gas exhauster by a cyclone process.

In an example embodiment, the apparatus may further include a chamber heater enclosing the process chamber, so that the interior of the process chamber is heated to a temperature at which the source and the catalyst powder are reacted with each other.

According to the present invention, a source gas may be supplied into a process chamber in a second direction opposite to a first direction along which a catalyst powder may be supplied into the process chamber, to thereby reduce the drop velocity of the catalyst powder. Therefore, the source gas and the catalyst powder may be reacted with each other for a sufficiently long time, to thereby improve the reaction rate of the source gas and the catalyst powder. In addition, control of the flow rate of the source gas allows control of the drop velocity reduction of the catalyst powder, and thus the source gas and the catalyst powder may be reacted with each other for a sufficiently long time. As a result, CNTs may be efficiently generated in a relatively narrow space. In addition, the CNTs may be collected immediately when the CNTs are generated in the process chamber while the catalyst powder falls down in the process chamber, to thereby improve the yield and purity of the CNTs.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF THE EMBODIMENTS

Figure 1:
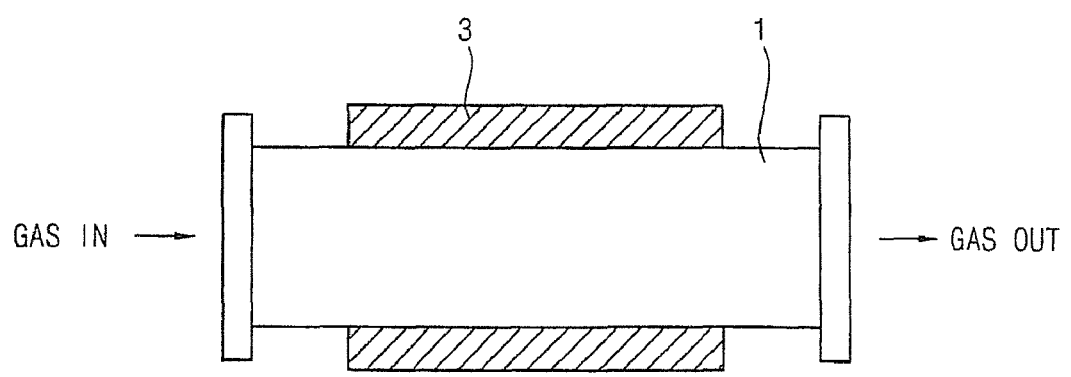
FIG. 1 is a cross-sectional view illustrating a schematic structure of an apparatus for generating conventional carbon nanotubes (CNTs)

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on, connected or coupled to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
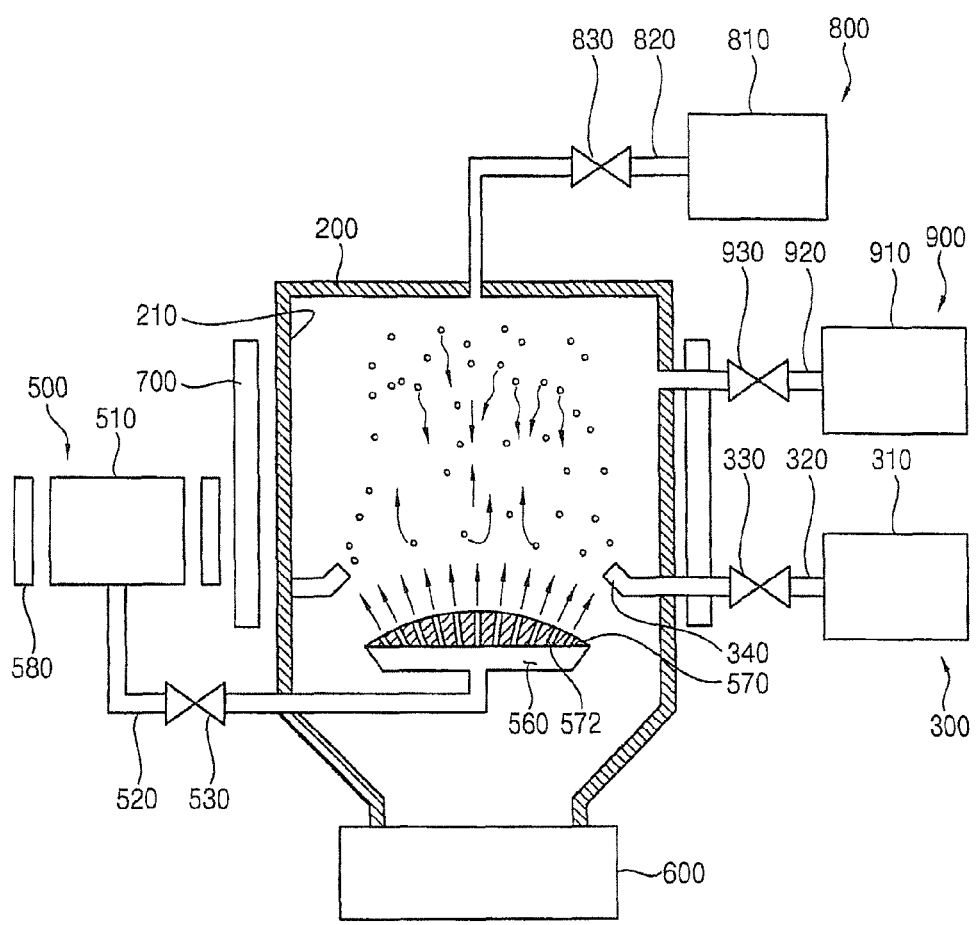
FIG. 2 is a cross-sectional view schematically illustrating an apparatus for generating a CNT in accordance with example embodiments of the present invention.
Figure 3:
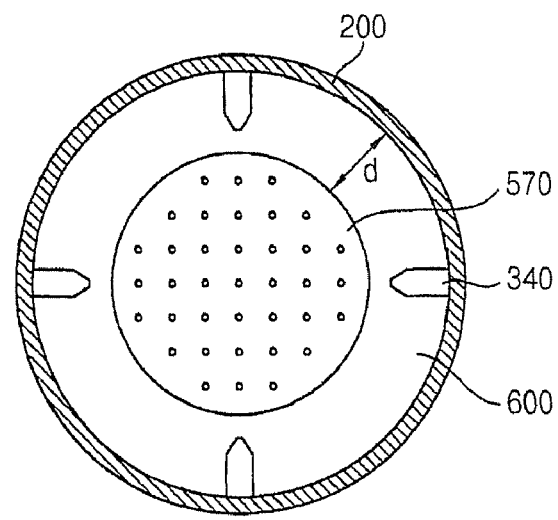
FIG. 3 is a plan view illustrating the apparatus for generating the CNT shown in FIG. 2.

FIG. 2 is a cross-sectional view schematically illustrating an apparatus for generating a carbon nanotube (CNT) in accordance with example embodiments of the present invention, and FIG. 3 is a plan view illustrating the apparatus for generating the CNT shown in FIG. 2.

Referring to FIG. 2, the apparatus for generating a CNT may include a process chamber 200, a catalyst supplier 300, a source gas supplier 500 and a collector 600.

The process chamber 200 may provide a space for generating the CNT. Particularly, the CNT in the present example embodiment may be generated in the space of the process chamber 200 using heat provided by an external heat source. For example, the process chamber 200 may be heated to an internal temperature of about 500° C. to about 1,100° C., so that the process chamber 200 may comprise heat-resistant materials sufficiently resistant to the internal temperature. Examples of the heat-resistant material may include quartz, graphite and a mixture thereof.

In example embodiments of the present invention, the process chamber 200 may include a cylindrical tube vertically standing with respect to the ground. That is, a central axis of the cylindrical process chamber 200 may be perpendicular to the ground, so that the space for reaction of source gases and a catalyst powder, which are to be described in detail hereinafter, may be sufficiently provided in the process chamber 200.

The catalyst supplier 300 may supply a catalyst into the process chamber 200. For example, the catalyst may include a transition metal such as iron or cobalt and the catalyst may be supplied as a powder type (hereinafter referred to as catalyst powder). That is, the catalyst may include a transition metal powder. The powder type catalyst may increase the reaction rate of the source gases as compared with a liquefied catalyst.

In an example embodiment, the catalyst supplier 300 may include a catalyst reservoir 310 in which the catalyst is stored, a catalyst supply pipe 320 interposed between the catalyst reservoir 310 and the process chamber 200 and a catalyst control valve 330 positioned on a portion of the catalyst supply pipe 320 and controlling the amount of the catalyst powder supplied into the process chamber 200. In the present embodiment, the catalyst reservoir 310 is arranged outside of the process chamber 200 and the catalyst supply pipe 320 penetrates into a sidewall of the cylindrical process chamber 200 from the exterior to the interior of the process chamber 200. Accordingly, the catalyst powder is supplied into the process chamber 200 from the exterior to the interior of the process chamber 200 through the catalyst supply pipe 320. The catalyst control valve 330 may control the flow rate of the catalyst that is supplied into the process chamber 200.

In an example embodiment, the catalyst supplier 300 may further include at least one spray nozzle 340 that is connected to an end portion of the catalyst supply pipe 320 in the process chamber 200. For example, a plurality of the spray nozzles 340 is arranged on an inner side surface 210 of the lower process chamber 200 and is connected to the catalyst supply pipe 320. In the present example embodiment, four spray nozzles are arranged on the inner side surface of the cylindrical process chamber 200 along the circumference of the cylindrical tube, as shown in FIG. 3. Many spray nozzles 340, for example, greater than four, may also be arranged on the inner side surface of the cylindrical process chamber at substantially the same gap distances along the circumference of the cylindrical tube, as would be known to one of ordinary skill in the art.

In an example embodiment, the spray nozzle 340 may be directed to an upper portion of the process chamber 200 at a spray angle with respect to a bottom of the cylindrical tube, so that the catalyst or the catalyst powder may be supplied to the upper portion of the process chamber, that is, to a top of the cylindrical process chamber 200 and the sidewall adjacent to the top thereof. As a result, the catalyst powder may move down from the upper portion to the lower portion of the cylindrical process chamber 200 in a first direction. That is, the catalyst powder may freely fall downward in the first direction in the process chamber 20.

Accordingly, the catalyst supplier 300 may supply the catalyst powder into the process chamber 200 from the exterior in such a manner that the catalyst powder moves downward in the first direction in the process chamber 200. In the present example embodiment, the first direction may be directed to the lower portion from the upper portion of the process chamber 200, so that the catalyst powder may fall free downward in the first direction in the process chamber 200. While the present example embodiment discloses that the catalyst powder freely falls down in the first direction, the catalyst powder may move any other directions in the process chamber 200 in accordance with process conditions and circumstances, as would be known to one of ordinary skill in the art.

In an example embodiment, the source gas supplier 500 may include a source gas reservoir 510 in which the source gas is stored, a source supply pipe 520 interposed between the source gas reservoir 510 and the process chamber 200 and a source control valve 530 positioned on a portion of the source supply pipe 520 and controlling the amount of the source gas supplied into the process chamber 200. The source gas supplier 500 may supply the source gas into the process chamber 200 through the source supply pipe 520. The source control valve 530 may be positioned at a portion of the source supply pipe 520 and thus the amount of the source gas supplied into the process chamber 200 may be controlled by the source control valve 530.

In example embodiments, the source reservoir 510 may be arranged outside of the process chamber 200 and the source supply pipe 520 may penetrate through the sidewall of the cylindrical process chamber 200 from the exterior to the interior thereof. Accordingly, the source gas is supplied into the process chamber 200 from the exterior to the interior of the process chamber 200 through the source supply pipe 520. The source control valve 530 may control the flow rate of the source gas that is supplied into the process chamber 200. In the present example embodiment, the source supply pipe 520 penetrates into the sidewall of the lower portion of the process chamber 200 to a central portion of the process chamber 200, so that the source gas is supplied into the central portion of the lower portion of the process chamber 200.

In example embodiments, the source gas may be supplied into the process chamber 200 from the lower portion to the upper portion thereof in a second direction that is substantially opposite to the first direction directed to the upper portion to the lower portion of the process chamber 200, because the source supply pipe 520 may be positioned at the lower portion of the process chamber 200.

Accordingly, the source gas may flow against the freefalling of the catalyst powder, and thus the movement of the catalyst powder may be interrupted by the source gas and the drop of the catalyst powder from the upper portion to the lower portion may be delayed in the process chamber 200. That is, when the source gas may not flow against the freefalling of the catalyst powder in the process chamber 200, the catalyst powder may fall down from the upper portion to the lower portion of the process chamber 200 for a first time. However, when the free-falling of the catalyst powder may be interrupted by a flow of the source gas in the second direction, the catalyst powder may fall down from the upper portion to the lower portion of the process chamber 200 for a second time at a greater rate than the first time. Therefore, when the source gas may be supplied into the process chamber 200 in the second direction, the catalyst powder falls down much more slowly due to the upward flow of the source gas, so that the catalyst powder and the source gas may be reacted with each other for a longer time and the reaction rate for generating the CNTs may be sufficiently increased in the process chamber 200, to thereby improve yield ratio and purity of the CNTs. The amount or the flow rate of the source gas may be controlled by the source control valve 530 and thus the intensity of the source gas flow against the catalyst powder may be varied by the source control valve 530. Therefore, the drop velocity of the catalyst powder may be controlled by the source supply valve 530. In addition, the source gas may be controlled by an additional controller (not shown), so that the flow rate of the source gas supplied into the process chamber 200 and the drop velocity of the catalyst powder may also be varied by the additional controller, as would be known to one of ordinary skill in the art. Control of the amount or the flow rate of the source gas is to be described in detail with reference to FIG. 4 hereinafter.

In example embodiment, the source gas supplier 500 may further include a dispersion plate 570 that is connected to the source supply pipe 530 in the process chamber 200. In the present example embodiment, the dispersion plate 570 may be positioned at the central portion of the lower portion of the process chamber 200 and may include a plurality of spray holes 572 on a top surface thereof, so that the source gas may be supplied into the process chamber 200 through the spray holes 572 of the dispersion plate 570. In addition, a dispersion space 560 may be further positioned between the source supply pipe 520 and the dispersion plate 570 in such a configuration that a volume size of the dispersion space 560 is much greatly increased as compared with the volume size of the source supply pipe 520. Therefore, the source gas is firstly expanded and dispersed in the disperse space 560 by volume expansion and is dispersively supplied into the process chamber 200 through the spray holes 572 from the disperse space 560. As a result, the expanded source gas may be partially concentrated in accordance with the spray holes 572 and may be partially injected through each of the spray holes 572 uniformly scattered on the top surface of the dispersion plate 570. Accordingly, the source gas is supplied in the second direction through scattered spray holes 572 and uniformly spreads out upward in the process chamber 200.

Referring to FIG. 3, the dispersion plate 570 may be substantially smaller than the process chamber 200 in view of size. In example embodiments, in a case where the dispersion plate 570 and the cylindrical process chamber 200 has a circular cross-sectional area, the diameter of the dispersion plate 570 may be substantially smaller than that of the process chamber 200. In an example embodiment, the source gas may be injected upwards in almost all directions that sufficiently cover most of the space over the dispersion plate 570 in the process chamber 200, so that most of the catalyst powder may be interrupted while free-falling downward in the process chamber 200. For example, the top surface of the dispersion plate 570 may be shaped into a curved surface, so that the source gas may be sufficiently injected in almost all directions covering most of the space over the dispersion plate 570 although the size of the dispersion plate 570 is smaller than that of the process chamber 200. Accordingly, most of the catalyst powder may be interrupted while free-falling downward in the first direction in the process chamber 200 although the size of the dispersion plate 570 is smaller than that of the process chamber 200.

The dispersion plate 570 may be located at a position spaced apart from the sidewall 210 of the process chamber 200 by a gap distance D, and the shape of the dispersion plate 570 may be varied in accordance with the gap distance D. That is, the greater the gap distance D is, the smaller the curvature of the top surface of the dispersion plate 570 is and the smaller the gap distance D is, the larger the curvature of the top surface of the dispersion plate 570 is. The concave top surface of the dispersion plate 570 may allow the source gas to be sufficiently dispersed in the process chamber 200, and thus the falling down of each catalyst powder may be delayed by the flow of the source gas although the size of the dispersion plate 570 is smaller than that of the cylindrical process chamber 200.

As described above, the flow of the source gas in the second direction may delay the drop velocity of the catalyst powder in the process chamber 200, so that the source gas and the catalyst powder may be reacted with each other for a sufficient time to thereby generate high-purity CNTs.

The collector 600 may recover the CNTs from the process chamber 200. For example, the collector 600 may be positioned under the process chamber 200 and thus the CNTs generated in the process chamber 200 may fall down toward the lower portion of the process chamber 200 to thereby be collected into the collector 600.

In the present example embodiment, the dispersion plate 570 is smaller than the process chamber 200 and the dispersion plate 570 is positioned at the central portion of the lower portion of the process chamber 200, and thus the dispersion plate 570 is spaced apart from the sidewall 210 of the process chamber 200 by the gap distance D and a gap space is interposed between the sidewall of the process chamber 200 and the dispersion plate 570. In such a case, the CNTs generated in the process chamber 200 may be collected through the gap space between the dispersion plate 570 and the sidewall 210 of the process chamber 200 into the collector 600. The source gas and the catalyst powder are reacted with each other to thereby generate the CNTs in the space of the upper portion of the process chamber 200 and the CNTs also freely fall downward while the catalyst powder freely falls downward sufficiently slowly in the first direction in the process chamber 200. The CNTs continuously freely fall downward in the process chamber 200 and pass through the gap space between the dispersion plate 570 and the sidewall 210 of the process chamber 200. The CNTs passing through the gap space may be collected into the collector 600 under the process chamber 200.

While the present example embodiment discloses that the CNTs may be collected simultaneously with the generation of the CNTs in the process chamber 200, the CNTs may also be collected after completing the generation of the CNTs in the process chamber 200 using an additional collector, as would be known to one of ordinary skill in the art. In such a case, an additional buffer space may be located at a bottom portion of the process chamber 200, and thus the generated CNTs may be temporarily stored into the buffer space and then may be extracted into the collector after completing the generation process of the CNTs.

In an example embodiment, the apparatus 100 for generating the CNT may further include a chamber heater 700, a gas exhauster 800 and a pressure controller 900.

The chamber heater 700 may heat the inside of the process chamber 200 to a temperature of about 500° C. to about 1,100° C. For example, the heater may include a heating coil enclosing the process chamber 200.

The gas exhauster 800 may exhaust the sources gas from the process chamber 200 to the outside. The gas exhauster 800 will be described in detail with reference to FIG. 7.

The pressure controller 900 may be connected to the process chamber 200 and may control an internal pressure of the process chamber 200. The pressure controller 900 may include a vacuum pump 910 which pumps out the gas of the process chamber 200, a pressure control pipe 920 interposed between the vacuum pump 910 and the process chamber 200 and a pressure control valve 930 positioned on a portion of the pressure control pipe 920 and controlling the amount of the gas pumped out from the process chamber 200. Thus, the pressure controller 900 may maintain the process chamber 200 to be in a vacuum state by reducing the internal pressure of the process chamber 200.

According to the present invention, the source gas is supplied against the free-falling of the catalyst powder, to thereby reduce the drop velocity of the catalyst powder. Therefore, control of the flow rate of the source gas allows control of the drop velocity reduction of the catalyst powder, so that the source gas and the catalyst powder may be reacted with each other for a sufficiently long time. As a result, the CNTs may be efficiently generated in a relatively narrow space. In addition, the CNTs may be collected immediately when the CNTs are generated in the process chamber while the catalyst powder falls down in the process chamber, to thereby improve the yield and purity of the CNTs.

Figure 4:
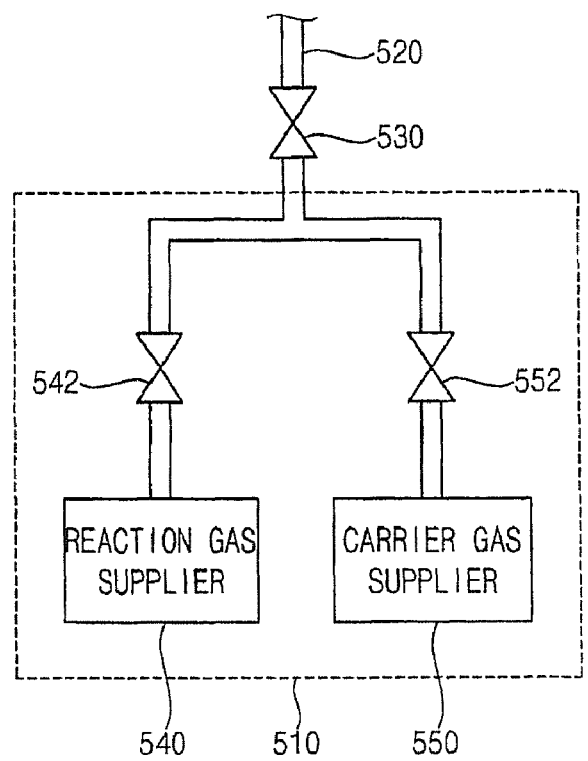
FIG. 4 is a view illustrating a schematic structure of a source reservoir in the source gas supplier shown in FIG. 2.

FIG. 4 is a view illustrating a schematic structure of a source reservoir in the source gas supplier shown in FIG. 2.

Referring to FIG. 4, the source gas reservoir 510 may include a reaction gas reservoir 540 and a carrier gas reservoir 550.

The reaction gas reservoir 540 may store a reaction gas that is reacted with the catalyst powder in the process chamber 200 to thereby generate the CNTs and the carrier gas reservoir 550 may store a carrier gas for carrying the reaction gas into the process chamber 200. Examples of the reaction gas may include acetylene ($C_2H_2$), ethylene ($C_2H_4$), methane ($CH_4$), benzene ($C_6H_6$), xylene ($C_6H_4(CH_3)_2$), carbon monoxide (CO), carbon dioxide ($CO_2$), etc. These may be used alone or in combinations thereof. Examples of the carrier gas may include an inactive gas such as argon (Ar) gas and chromium (Cr) gas.

In example embodiments, the carrier gas may be supplied into the process chamber 200 in the second direction while the supply of the reaction gas is stopped by a reaction gas control valve 542, and thus the drop velocity of the catalyst powder may be reduced by the flow of the carrier gas in the second direction. When the drop velocity of the catalyst powder is sufficiently reduced, the reaction gas control valve 542 is open and the reaction gas is supplied into the process chamber 200 in the second direction. Otherwise, the carrier gas and the reaction gas may also be simultaneously supplied into the process chamber 200, as would be known to one of ordinary skill in the art. While the reaction gas is supplied into the process chamber 200 at a constant flow rate, the flow rate of the carrier gas may be varied by a carrier gas control valve 552 in such a manner that the amount of the carrier gas may be gradually decreased on condition that the supply of the carrier gas is not completely stopped. The reaction gas control valve 542 and the carrier gas control valve 552 may control a mixture ratio of the reaction gas and the carrier gas. Accordingly, the source gas is supplied against the free-falling of the catalyst powder and the drop velocity of the catalyst powder is sufficiently reduced. Control of the flow rate of the source gas allows control of the drop velocity reduction of the catalyst powder, so that the source gas and the catalyst powder may be reacted with each other for a sufficiently long time. As a result, the CNTs may be efficiently generated in a relatively narrow space.

Figure 5:
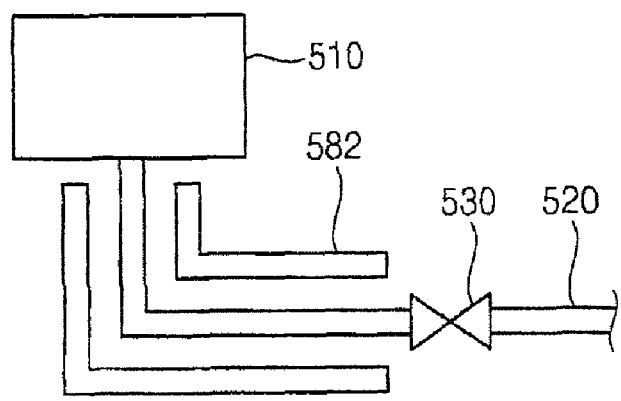
FIGS. 5 and 6 are views illustrating a schematic structure of the source gas supplier shown in FIG. 2.
Figure 6:
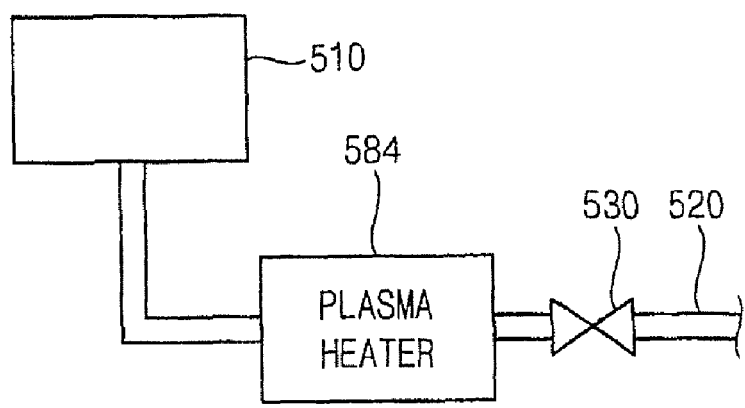

FIGS. 5 and 6 are views illustrating a schematic structure of the source gas supplier shown in FIG. 2.

Referring to FIGS. 2, 5 and 6, the source gas supplier 500 may further include a source heater 580 for heating in advance before the source gas is supplied into the process chamber 200. For example, the source heater 580 may be positioned adjacent to the source gas supplier 500. In the present example embodiment, the source heater 580 may enclose one of the source reservoir 510 and the source supply pipe 520. Accordingly, the source heater 580 may heat the source gas in the source gas supplier 500.

In an example embodiment, the source heater 580 may include a heating coil 572 enclosing the source supply pipe 520, as shown in FIG. 5 and the source heater 580 may also include a plasma heater 584 located at a portion of the source supply pipe 520 between the source reservoir 510 and the source control valve 530. The source gas may be heated in advance by plasma of the plasma heater 584 before supplying into the process chamber 200. While the present example embodiment discloses the heat coil and the plasma heater as the source heater 580, various heating devices may also be utilized for heating the source gas in advance in place of or in conjunction with the above heaters, as would be known to one of ordinary skill in the art.

As described above, the source gas may be heated in advanced by the source heater 580 and the preheated source gas may be supplied into the process chamber 200. When the source gas may include acetylene ($C_2H_2$), ethylene ($C_2H_4$), methane ($CH_4$), benzene ($C_6H_6$), xylene ($C_6H_4(CH_3)_2$), carbon monoxide (CO), or carbon dioxide ($CO_2$), the source gas may be activated into some radicals having carbon (C) by the source heater 580. That is, the source gas may be supplied into the process chamber 200 as activated radicals, to thereby remarkably improve the generation efficiency of the CNTs.

Figure 7:
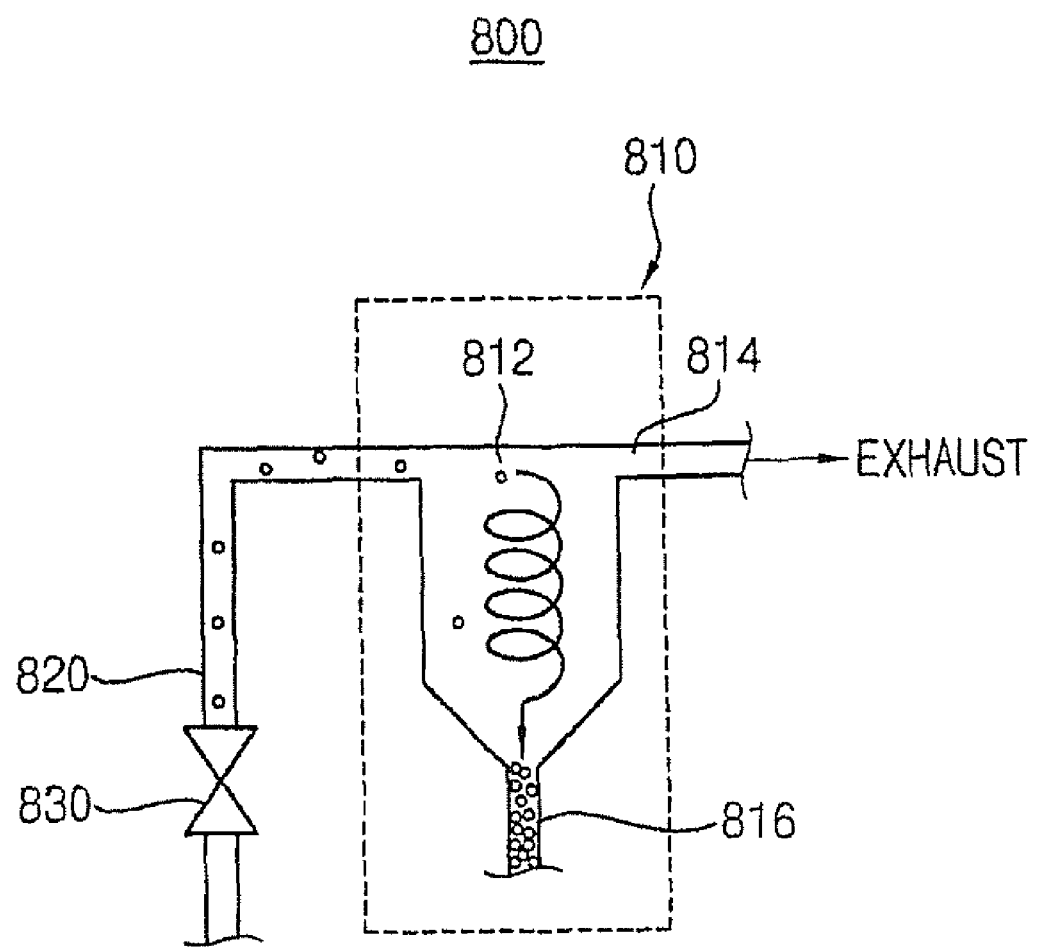
FIG. 7 is a view illustrating a schematic structure of a gas exhauster shown in FIG. 2.

FIG. 7 is a view illustrating a schematic structure of a gas exhauster shown in FIG. 2.

Referring to FIGS. 2 and 7, the gas exhauster 800 may include a separation chamber 810 in which the source gas and the catalyst powder are separated from each other, an exhausting pipe 820 connected to the process chamber 200 and the separation chamber 810 and an exhausting valve 830 located on a portion of the exhausting pipe 820 and controlling the flow rate of the exhausted gas from the process chamber 200.

The separation chamber 810 may include a body 812, a source outlet 814 and a catalyst outlet 816 connected to a lower portion of the body 812 of the separation chamber 810. The body 812 may be connected to the exhausting pipe 820. The source gas may be delivered into the body 812 of the separation chamber 810 and may be exhausted from the process chamber 200 through the source outlet 814 by a cyclone process. The catalyst powder may be delivered into the body 812 of the separation chamber 810 and may be exhausted from the process chamber 200 through the catalyst outlet 816 by the cyclone process. That is, when a mixture of the source gas and the catalyst powder is delivered into the separation chamber 810, the mixture is rotated at very high revolutionary speed by the cyclone process in the body 812 and thus the source gas, which is lighter than the catalyst powder, is guided to an upper portion of the body 812 and the catalyst powder, which is heavier than the source gas, is guided to the lower portion of the body 812. Therefore, the source gas may be exhausted from the process chamber 200 through the source outlet 814 at the upper portion of the body 812 and the catalyst powder may be exhausted from the process chamber 200 through the catalyst outlet 816 at the lower portion of the body 814. As a result, the source gas and the catalyst powder may be exhausted from the process chamber 200 by the gas exhauster 800.

While the present example embodiment discloses that the source gas and the catalyst powder are exhausted from the process chamber 200 by the cyclone process, the source gas and the catalyst powder may also be regenerated by re-supplying the exhausted source gas and catalyst powder into the process chamber again, as would be known to one of ordinary skill in the art.

Figure 8:
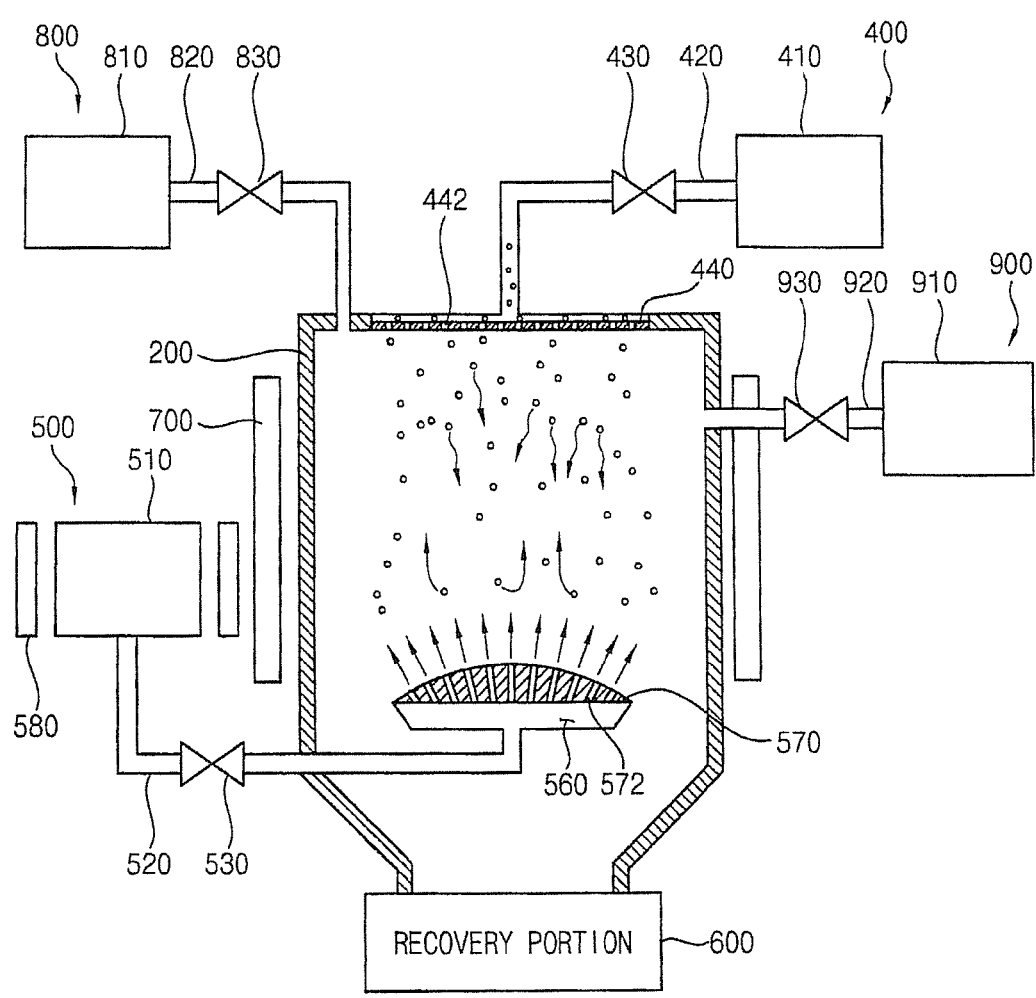
FIG. 8 is a cross-sectional view schematically illustrating an apparatus for generating a CNT in accordance with another example embodiment of the present invention.

FIG. 8 is a cross-sectional view schematically illustrating an apparatus for generating a CNT in accordance with another example embodiment of the present invention. The CNT generation apparatus shown in FIG. 8 has the same structure as the CNT generation apparatus shown in FIG. 2 except the catalyst supplier. Thus, in FIG. 8, the same reference numerals denote the same or like elements in FIG. 2 and any detailed descriptions on the same elements will be omitted.

Referring to FIG. 8, a catalyst supplier 400 may supply a catalyst into the process chamber 200 as a powder type. For example, the catalyst may include a transition metal such as iron or cobalt. That is, a transition metal powder may be supplied into the process chamber 200 as the catalyst by the catalyst supplier 400.

In an example embodiment, the catalyst supplier 400 may include a catalyst reservoir 410 in which the catalyst is stored, a catalyst supply pipe 420 interposed between the catalyst reservoir 410 and the process chamber 200 and a catalyst control valve 430 positioned on a portion of the catalyst supply pipe 420 and controlling the amount of the catalyst powder supplied into the process chamber 200. In the present embodiment, the catalyst reservoir 410 is arranged over the process chamber 200 and the catalyst supply pipe 420 penetrates into a cover of the cylindrical process chamber 200 from the exterior to the interior of the process chamber 200. Accordingly, the catalyst powder is supplied into the process chamber 200 from the exterior to the interior of the process chamber 200 through the catalyst supply pipe 420 penetrating through the cover of the process chamber 200. The catalyst control valve 430 may control the flow rate of the catalyst powder that is supplied into the process chamber 200.

In an example embodiment, the catalyst supplier 400 may further include at least one dispersion net 440 that is arranged at an upper portion of the process chamber 200 and has a mesh structure. A plurality of the dispersion holes 442 is arranged and uniformly distributed on the dispersion net 440, so that the catalyst powder is supplied into the process chamber 200 from the upper portion to the lower portion thereof in the first direction. As described above, the first direction is also directed from the upper portion to the lower portion of the process chamber in the present example embodiment.

In an example embodiment, the size of the dispersion net 440 may be substantially smaller than that of the process chamber 200. In a case where the dispersion net 440 and the cylindrical process chamber 200 has a circular cross-sectional area, the diameter of the dispersion net 440 may be substantially smaller than that of the process chamber 200. Therefore, the catalyst powder may fall down through the dispersion holes 442 of the dispersion net 440, so that the catalyst powder may be uniformly supplied into the space of the process chamber 200.

When the source gas is supplied against the free-falling of the catalyst powder through the dispersion holes 442 of the dispersion net 440, the drop velocity of the catalyst powder is sufficiently reduced, and thus the source gas and the catalyst powder may be reacted with each other for a sufficiently long time. Particularly, control of the flow rate of the source gas allows control of the drop velocity reduction of the catalyst powder, and thus the source gas and the catalyst powder may be reacted with each other for a sufficiently long time. As a result, the CNTs may be efficiently generated in a relatively narrow space. In addition, the CNTs may be collected immediately when the CNTs are generated in the process chamber while the catalyst powder falls down in the process chamber, to thereby improve the yield and purity of the CNTs.

Figure 9:
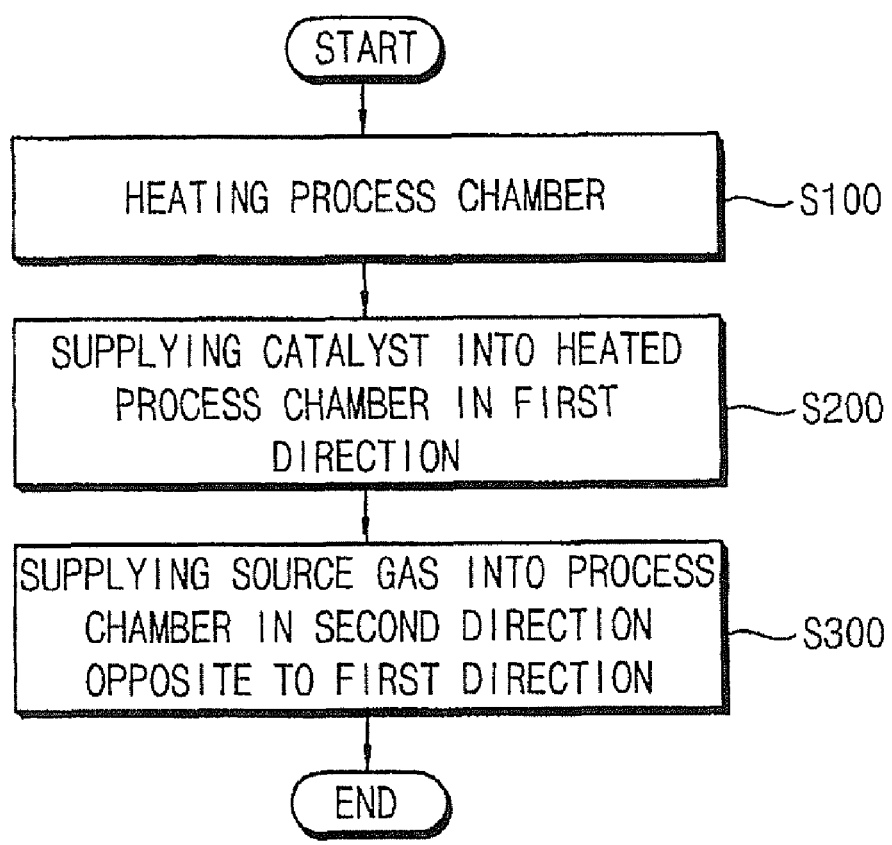
FIG. 9 is a flowchart showing a method of generating a CNT in accordance with an example embodiment of the present invention.

FIG. 9 is a flowchart showing a method of generating a CNT in accordance with an example embodiment of the present invention.

Referring to FIGS. 2, 8 and 9, the process chamber may be heated to a process temperature (step S100) and the catalyst powder may be supplied into the heated process chamber in the first direction (step S200). The source gas may be supplied into the process chamber in the second direction opposite to the first direction (step S300).

Particularly, the chamber heater 700 may heat the process chamber 200 to a target temperature. For example, the process chamber 200 may be heated to the target temperature through a preheating step and a main heating step or may be heated to the target temperature at one step. The process chamber 200 may be heated to a temperature lower than the target temperature in the preheating step and then may be heated again to the target temperature. The target temperature is a temperature at which the source gas and the catalyst powder may be most activated. For example, the target temperature may be in a range of about 500° C. to about 1,100° C.

Then, the catalyst powder may be supplied into the heated process chamber 200 by the catalyst supplier 300 or 400. For example, the catalyst powder may include a transition metal powder such as iron and nickel. In an example embodiment, the catalyst powder may be shaped into a sphere, so that the surface area of the catalyst powder may be enlarged as much as possible and thus the contact area of the source gas and the catalyst powder may be maximized in the process chamber 200. The size, density and agglomeration degree of the catalyst powder may be varied in accordance with process conditions and kinds of the process.

The catalyst powder may be supplied into the process chamber in the first direction from the upper portion to the lower portion of the process chamber 200. Thus, the catalyst powder may freely fall down from the upper portion of the process chamber to the lower portion thereof.

In example embodiments, the catalyst supplier 300 or 400 includes a spray nozzle directed to the upper portion of the process chamber 200. The catalyst powder may be injected to the upper portion of the process chamber 200 through the spray nozzle 340 and may freely fall downward to the lower portion of the process chamber 200. In other example embodiments, the catalyst supplier includes a dispersion net 440 located on the upper portion of the process chamber 200, so that the catalyst powder may be supplied into the process chamber 200 from the upper portion to the lower portion by the dispersion net 440. While the present example embodiment discloses the spray nozzle and the dispersion net for dispersively supplying the source gas into the upper portion of the process chamber 200, any other configurations known to one of the ordinary skill in the art may also be utilized in place of or in conjunction with the spray nozzle and the dispersion net on condition that the catalyst powder may freely fall down from the upper portion to the lower portion of the process chamber 200.

The source gas may be supplied into the process chamber 200 by the source supplier 500. Examples of the source gas may include acetylene ($C_2H_2$), ethylene ($C_2H_4$), methane ($CH_4$), benzene ($C_6H_6$), xylene ($C_6H_4(CH_3)_2$), carbon monoxide (CO), carbon dioxide ($CO_2$), etc. These may be used alone or in combinations thereof. In an example embodiment, the source gas may be uniformly supplied into the process chamber 200 through the dispersion plate 570. Particularly, the source gas may be injected into the process chamber 200 through a plurality of the dispersion holes 572 of the dispersion plate 570. In addition, the source gas may be firstly expanded and dispersed in the disperse space 560 by volume expansion and is dispersively supplied into the process chamber 200 through the spray holes 572 from the disperse space 560. As a result, the expanded source gas may be partially concentrated in accordance with the spray holes 572 and may be partially injected through each of the spray holes 572 uniformly scattered on the top surface of the dispersion plate 570. Accordingly, the source gas is supplied in the second direction through scattered spray holes 572 and uniformly spreads out upward in the process chamber 200.

When the size of the dispersion plate 570 is smaller than that of the process chamber 200 and the CNTs generated in the process chamber 200 may be collected through the gap space between the dispersion plate 570 and the sidewall 210 of the process chamber 200, the top surface of the dispersion plate 570 may be shaped into a curved surface. Therefore, the source gas may be sufficiently injected in almost all directions covering most of the space over the dispersion plate 570 although the size of the dispersion plate 570 is smaller than that of the process chamber 200. Accordingly, most of the catalyst powder may be interrupted while free-falling downward in the first direction in the process chamber 200 although the size of the dispersion plate 570 is smaller than that of the process chamber 200.

The source gas is supplied into the process chamber 200 in the second direction substantially opposite to the firs direction, to thereby reduce the drop velocity of the catalyst powder. Therefore, the source gas and the catalyst powder may be reacted with each other for a sufficiently long time. Particularly, control of the flow rate of the source gas allows control of the drop velocity reduction of the catalyst powder, and thus the source gas and the catalyst powder may be reacted with each other for a sufficiently long time. As a result, the CNTs may be efficiently generated in a relatively narrow space. In addition, the CNTs may be collected immediately when the CNTs are generated in the process chamber 200 while the catalyst powder falls down in the process chamber, to thereby improve the yield and purity of the CNTs.

In an example embodiment, the source gas may be heated in advance by the source heater 580 before supplying into the process chamber 200. When the source gas may include acetylene ($C_2H_2$), ethylene ($C_2H_4$), methane ($CH_4$), benzene ($C_6H_6$), xylene ($C_6H_4(CH_3)_2$), carbon monoxide (CO), or carbon dioxide ($CO_2$), the source gas may be activated into some radicals having carbon (C) by the source heater 580. That is, the source gas may be supplied into the process chamber 200 as activated radicals, to thereby remarkably improve the generation efficiency of the CNTs.

In an example embodiment, the CNTs may be collected into the collector from the process chamber 200. For example, the collector 600 may be positioned under the process chamber 200 and thus the CNTs generated in the process chamber 200 may fall down toward the lower portion of the process chamber 200 to thereby collected into the collector 600. In the present example embodiment, the dispersion plate 570 is smaller than the process chamber 200 and the dispersion plate 570 is positioned at the central portion of the lower portion of the process chamber 200, and thus the dispersion plate 570 is spaced apart from the sidewall 210 of the process chamber 200 by the gap distance D and a gap space is interposed between the sidewall of the process chamber 200 and the dispersion plate 570. In such a case, the CNTs generated in the process chamber 200 may be collected through the gap space between the dispersion plate 570 and the sidewall 210 of the process chamber 200 into the collector 600. The CNTs generated in the space of the upper portion of the process chamber 200 freely fall downward while the catalyst powder freely falls downward sufficiently slowly in the first direction in the process chamber 200. The CNTs continuously freely fall downward in the process chamber 200 and pass through the gap space between the dispersion plate 570 and the sidewall 210 of the process chamber 200. The CNTs passing through the gap space may be collected into the collector 600 under the process chamber 200. While the present example embodiment discloses that the CNTs may be collected simultaneously with the generation of the CNTs in the process chamber 200, the CNTs may also be collected after completing the generation of the CNTs in the process chamber 200 using an additional collector, as would be known to one of ordinary skill in the art. In such a case, an additional buffer space may be located at a bottom portion of the process chamber 200, and thus the generated CNTs may be temporarily stored into the buffer space and then may be extracted into the collector after completing the generation process of the CNTs.

Accordingly, the source gas may be supplied into the process chamber in the second direction opposite to the first direction along which the catalyst powder may be supplied into the process chamber, to thereby reduce the drop velocity of the catalyst powder. Therefore, the source gas and the catalyst powder may be reacted with each other for a sufficiently long time. Particularly, control of the flow rate of the source gas allows control of the drop velocity reduction of the catalyst powder, and thus the source gas and the catalyst powder may be reacted with each other for a sufficiently long time. As a result, the CNTs may be efficiently generated in a relatively narrow space. In addition, the CNTs may be collected immediately when the CNTs are generated in the process chamber while the catalyst powder falls down in the process chamber, to thereby improve the yield and purity of the CNTs.

According to the present invention, a source gas may be supplied into a process chamber in a second direction opposite to a first direction along which a catalyst powder may be supplied into the process chamber, to thereby reduce the drop velocity of the catalyst powder. Therefore, the source gas and the catalyst powder may be reacted with each other for a sufficiently long time, to thereby improve the reaction rate of the source gas and the catalyst powder.

In addition, control of the flow rate of the source gas allows control of the drop velocity reduction of the catalyst powder, and thus the source gas and the catalyst powder may be reacted with each other for a sufficiently long time. As a result, CNTs may be efficiently generated in a relatively narrow space. In addition, the CNTs may be collected immediately when the CNTs are generated in the process chamber while the catalyst powder falls down in the process chamber, to thereby improve the yield and purity of the CNTs.

This invention has been described with reference to the example embodiments. It is evident, however, that many alternative modifications and variations will be apparent to those having skill in the art in light of the foregoing description. Accordingly, the present invention embraces all such alternative modifications and variations as falling within the spirit and scope of the appended claims.

What is claimed is:

1. An apparatus of generating a CNT, comprising:
a process chamber;
a catalyst supplier that supplies a catalyst powder into the process chamber in a first direction, the catalyst powder moving in a first direction in the process chamber; and
a source gas supplier that supplies a source gas into the process chamber in a second direction opposite to the first direction, so that the source gas delays the movement of the catalyst powder in the first direction and is reacted with the catalyst powder in the process chamber to thereby produce the CNT in the process chamber,
wherein the catalyst supplier includes a dispersion net that is positioned at an upper portion of the process chamber and has a mesh structure, so that the catalyst powder is dispersively supplied to the upper portion of the process chamber through the dispersion net and moves down in the first direction in the process chamber.

2. The apparatus of claim 1, wherein the first direction is directed to a lower portion of the process chamber from an upper portion thereof and the second direction is directed to the upper portion of the process chamber from the lower portion thereof.

3. The apparatus of claim 1, wherein the catalyst supplier includes at least one spray nozzle that is positioned at a sidewall of the process chamber and is directed to an upper portion of the process chamber, so that the catalyst powder is supplied to the upper portion of the process chamber through the spray nozzle and moves down in the first direction in the process chamber.

4. The apparatus of claim 1, wherein the size of the dispersion net is substantially smaller than that of the process chamber.

5. The apparatus of claim 1, further comprising a collector connected to the process chamber, so that the CNT is collected into the collector from the process chamber.

6. The apparatus of claim 5, wherein the source gas supplier further includes a dispersion plate that is positioned at a lower portion of the process chamber and dispersively supplies the source gas into the process chamber and the collector is arranged under the process chamber in such a configuration that the CNT is collected through a gap space between the dispersion plate and a sidewall of the process chamber.

7. The apparatus of claim 1, further comprising a gas exhauster arranged over the process chamber and having a cylindrical shape, so that the source gas is exhausted out of the process chamber through the gas exhauster by a cyclone process.

8. The apparatus of claim 1, further comprising a chamber heater enclosing the process chamber, so that the interior of the process chamber is heated to a temperature at which the source and the catalyst.

9. An apparatus of generating a CNT, comprising:
a process chamber;
a catalyst supplier that supplies a catalyst powder into the process chamber in a first direction, the catalyst powder moving in a first direction in the process chamber; and
a source gas supplier that supplies a source gas into the process chamber in a second direction opposite to the first direction, so that the source gas delays the movement of the catalyst powder in the first direction and is reacted with the catalyst powder in the process chamber to thereby produce the CNT in the process chamber,
wherein the source gas supplier includes:
a gas reservoir in which the source gas is stored;
a supply pipe that is connected with both of the gas reservoir and the process chamber;
a control valve that is arranged at the supply pipe and controls an amount of the source gas supplied into the process chamber through the supply pipe; and
a dispersion plate that is positioned at a lower portion of the process chamber and has a plurality of spray holes, so that the source gas is dispersively supplied into the process chamber through the spray holes and moves upward in the second direction in the process chamber;

wherein the size of the dispersion plate is substantially smaller than that of the process chamber and the dispersion plate is positioned at a central portion of the process chamber spaced apart from a sidewall of the process chamber by a distance.

10. The apparatus of claim 9, wherein the source gas supplier further includes a source heater by which the source gas is heated before supplying into the process chamber.

11. The apparatus of claim 10, wherein the source heater includes a heating coil enclosing at least one of the gas reservoir and the supply pipe.

12. The apparatus of claim 10, wherein the source heater includes a plasma heater interposed between the gas reservoir and the control valve.

13. The apparatus of claim 9, wherein the gas reservoir includes:

a reaction gas reservoir in which a reaction gas is stored, the reaction gas being reacted with the catalyst powder in the process chamber to thereby generate the CNT in the process chamber; and a carrier gas reservoir in which a carrier gas is stored, the carrier gas carrying the reaction gas into the process chamber.

\* \* \* \* \*